(12) United States Patent
Soh et al.

(10) Patent No.: US 6,276,124 B1
(45) Date of Patent: Aug. 21, 2001

(54) BI-METALLIC TIE-BOLT FOR MICROTURBINE POWER GENERATING SYSTEM

(75) Inventors: Jemeng Soh; Robert Chen, both of Torrance; Steve Kuei, San Diego, all of CA (US)

(73) Assignee: AlliedSignal Inc., Morristown, NJ (US)

(*) Notice: Subject to any disclaimer, the term of this patent is extended or adjusted under 35 U.S.C. 154(b) by 0 days.

(21) Appl. No.: 09/090,795

(22) Filed: Jun. 4, 1998

(51) Int. Cl.$^7$ ........................................................ F02C 3/00
(52) U.S. Cl. .................. 60/39.75; 415/216.1; 415/244 A
(58) Field of Search .................. 60/39.32, 39.75, 60/39.83, 39.511; 415/216.1, 244 A, 241 R, 241 B

(56) References Cited

U.S. PATENT DOCUMENTS

| | | | |
|---|---|---|---|
| 4,086,760 | * 5/1978 | Chute | 60/39.75 |
| 4,557,704 | * 12/1985 | Ito et al. | 464/181 |
| 4,722,630 | 2/1988 | Fang | 403/30 |
| 4,723,862 | 2/1988 | Ito et al. | 403/272 |
| 5,403,150 | * 4/1995 | McEachern et al. | 60/39.75 |
| 5,605,045 | 2/1997 | Halimi et al. | 60/607 |
| 5,855,112 | * 1/1999 | Bannai et al. | 60/39.511 |
| 5,881,607 | * 3/1999 | Ito et al. | 415/216.1 |

* cited by examiner

*Primary Examiner*—Charles G. Freay
(74) *Attorney, Agent, or Firm*—John R. Rafter; Ephraim Starr

(57) ABSTRACT

A microturbine power generation system includes an electrical generator, a turbine and a compressor intermediate the generator and the turbine. Rotating components of the turbine, compressor and electrical generator are secured together by a tie-bolt. The tie-bolt is pre-stressed such that faces of the rotating components of the turbine, electrical generator and compressor maintain contact during high-speed, high-temperature operation of the system. The tie-bolt includes a thermally less conductive short portion that is secured to the rotating component of the turbine wheel, and an elongated portion that extends through the rotating components of the compressor and electrical generator. The short, thermally less conductive portion of the tie-bolt inhibits heat from propagating from the turbine end towards the compressor. The short, thermally less conductive portion can be a titanium rod that is inertia-welded between the elongated portion of the tie-bolt and the rotating component of the turbine.

18 Claims, 3 Drawing Sheets

BI-METALLIC TIE-BOLT FOR MICROTURBINE POWER GENERATING SYSTEM

BACKGROUND OF THE INVENTION

The present invention relates generally to microturbine power generating systems. More specifically, the present invention relates to a tie-bolt for a microturbine power generating system.

The United States Electric Power Research Institute (EPRI), which is the uniform research facility for domestic electric utilities, predicts that up to 40% of all new electrical power generation could be provided by distributed generators by the year 2006. In many parts of the world lacking an electric infrastructure (e.g., transmission and distribution lines), the commercialization of distributed generators will be greatly expedited since central plants will not only cost more per kilowatt, but will also need expensive infrastructure installed to deliver power to the consumer. In the United States and other countries already having the electric infrastructure, the small, multi-fuel, modular distributed microturbine generation units will allow consumers of electricity to choose the correct method of electric service. The small, multi-fuel, modular distributed microturbine generation units will also allow consumers of electricity to choose the most cost-effective electric service.

Small, multi-fuel, modular distributed microturbine generation units could help alleviate current afternoon "brown-outs" and "blackouts" that are prevalent in many parts of the world. U.S. Pat. No. 4,754,607, which is assigned to the assignee of the present invention, discloses a microturbine power generating system suitable for co-generation applications. A simple, single moving part concept would allow for low technical skill maintenance. Low overall cost would allow for wide spread purchase in those parts of the world where capital is sparse.

A microturbine power generating system includes a turbine stage, a compressor stage and an electrical generator, with each stage including a rotating component (e.g., a turbine wheel, a compressor wheel and a permanent magnet rotor). Supported by foil bearings, the rotating components are clamped together to rotate as a unit. A tie bolt is used for clamping the components together.

Temperature gradients in the tie bolt can lead to problems. During operation of the microturbine power generating system, heat propagates through the tie-bolt from the turbine end towards the compressor. A temperature gradient arises because the turbine operates at a much higher temperature than the compressor. Resulting from the heat gradient is thermal expansion that causes shifting of the rotating components and the loss of the tight interface between the rotating components. The shift causes the components to become unbalanced. The unbalance damages the bearings and eventually causes the bearings to seize.

Thermal stress in the tie-bolt can also lead to problems. Each time the microturbine power generating system is started, the tie-bolt undergoes a thermal cycle (cold-to-hot); and each time the microturbine power generating system is stopped, the tie-bolt undergoes a thermal cycle (hot-to-cold). The thermal stress could eventually lead to fatigue failure of the tie-bolt.

There is a need to reduce the chance of fatigue failure in the tie-bolt. There is also a need to reduce the thermal expansion in the tie-bolt.

SUMMARY OF THE INVENTION

These problems are overcome by the present invention, which can be regarded as a microturbine power generating system. The microturbine power generating system includes a turbine for converting gaseous heat energy into mechanical energy; and a power converter for converting the mechanical energy produced by the turbine into electrical energy. The turbine includes a turbine wheel, and the power converter includes a rotor. The microturbine power generating system further includes a tie-bolt connecting the turbine wheel and the rotor in prestressed relation to allow the rotor to rotate in unison with the turbine wheel and to thereby use the mechanical energy extracted by the turbine to produce power.

The tie-bolt includes an elongated portion made of conventional tie-bolt material and a short portion that is made of titanium or another material that is less thermally conductive than the conventional tie-bolt material.

DESCRIPTION OF THE PREFERRED EMBODIMENT

Figure 1:
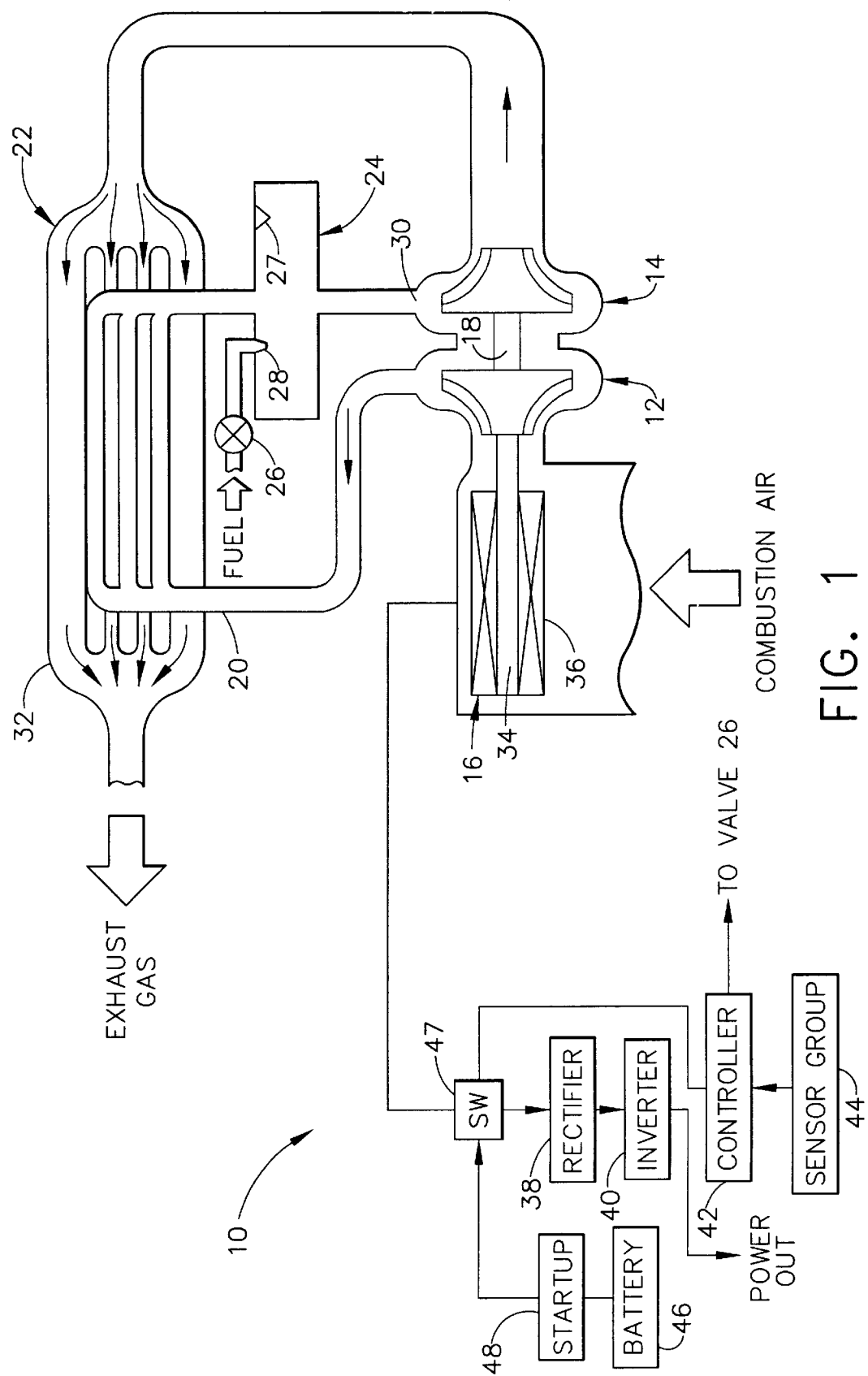
FIG. 1 is a block diagram of a power generating system according to the present invention.

Referring to FIG. 1, a power generating system 10 according to the present invention is illustrated. The power generating system 10 includes a compressor 12, a turbine 14 and an electrical generator 16. The electrical generator 16 is cantilevered from the compressor 12. The compressor 12, the turbine 14 and the electrical generator 16 are rotated by a single common shaft 18. Although the compressor 12, turbine 14 and electrical generator 16 can be mounted to separate shafts, the use of the single common shaft 18 adds to the compactness and reliability of the power generating system 10.

Figure 2:
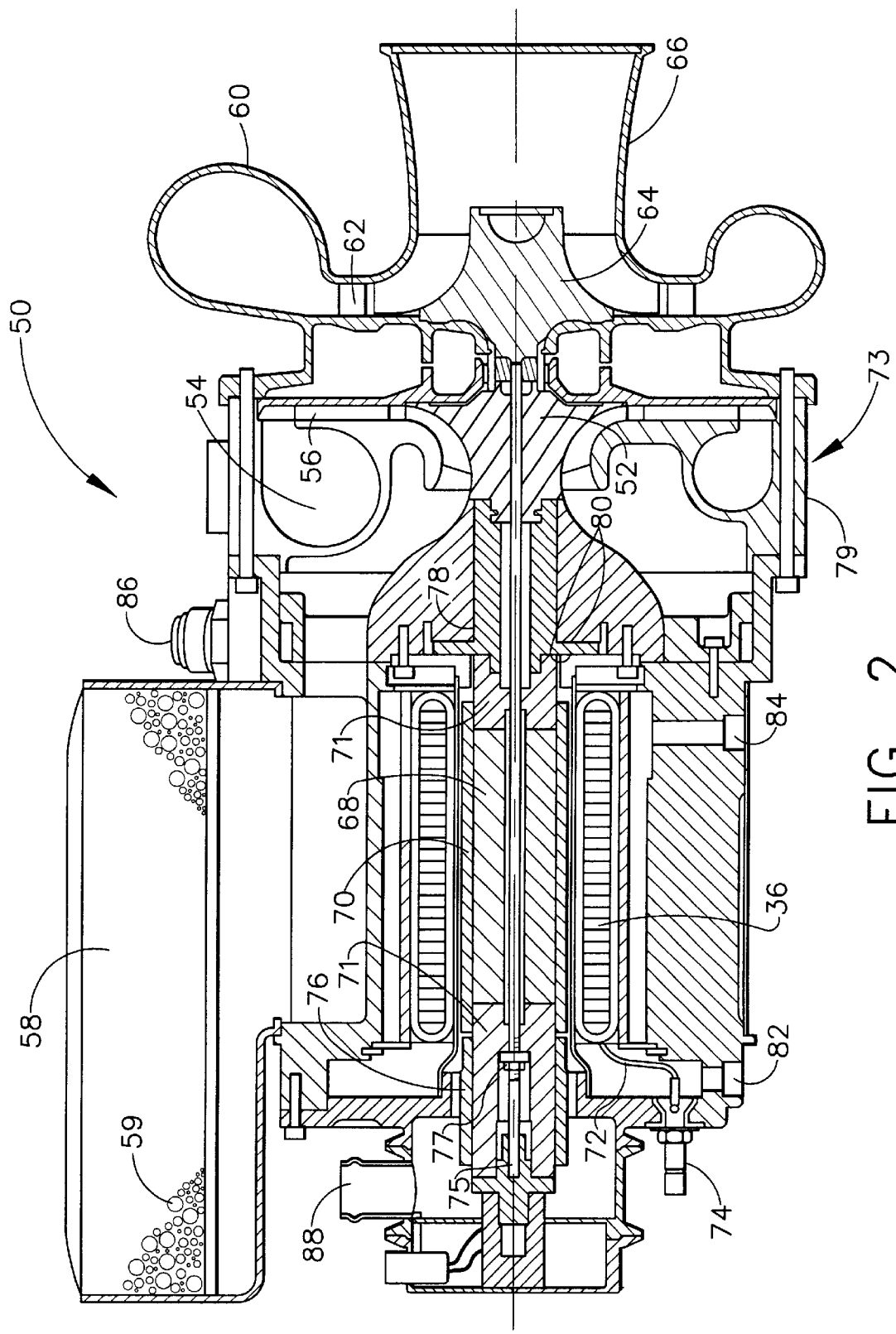
FIG. 2 is a cross-section view of an engine core for the power generating system, the engine core including a bi-metallic tie-bolt according to the present invention.

The shaft 18 can be supported by self-pressurized air bearings such as foil bearings. As is shown in FIG. 2, the shaft 18 is supported by journal foil bearings 76 and 78 and thrust foil bearings 80. The foil bearings 76, 78 and 80 eliminate the need for a separate bearing lubrication system and reduce the occurrence of maintenance servicing.

Air entering an inlet of the compressor 12 is compressed. Compressed air leaving an outlet of the compressor 12 is circulated through cold side passages 20 in a cold side of a recuperator 22. In the recuperator 22, the compressed air absorbs heat, which enhances combustion. The heated, compressed air leaving the cold side of the recuperator 22 is supplied to a combustor 24.

Fuel is also supplied to the combustor 24. Both gaseous and liquid fuels can be used. In gaseous fuel mode, any suitable gaseous fuel can be used. Choices of fuel include diesel, flair gas, off gas, gasoline, naphtha, propane, JP-8, methane, natural gas and other man-made gases.

The flow of fuel to the combustor 24 is controlled by a flow control valve 26. The fuel is injected into the combustor 24 by an injection nozzle 28.

Inside the combustor 24 the fuel and compressed air are mixed and ignited by an igniter 27 in an exothermic reaction.

In the preferred embodiment, the combustor 24 contains a suitable catalyst capable of combusting the compressed, high temperature fuel-air mixture at process conditions. Some known catalysts usable in the combustor 24 include platinum, palladium, as well as metal oxide catalyst with active nickel and cobalt elements.

Hot, expanding gases resulting from combustion in the combustor 24 are directed to an inlet nozzle 30 of the turbine 14. The inlet nozzle 30 has a fixed geometry. The hot, expanding gases resulting from the combustion are expanded through the turbine 14, thereby creating turbine power. The turbine power, in turn, drives the compressor 12 and the electrical generator 16.

Turbine exhaust gas is circulated by hot side passages 32 in a hot side of the recuperator 22. Inside the recuperator 22, heat from the turbine exhaust gas on the hot side is transferred to the compressed air on the cold side. In this manner, some heat of combustion is recuperated and used to raise the temperature of the compressed air en route to the combustor 24. After surrendering part of its heat, the gas exits the recuperator 22. Additional heat recovery stages could be added onto the power generating system 10.

The generator 16 can be a ring-wound, two-pole toothless (TPTL) brushless permanent magnet machine having a permanent magnet rotor 34 and stator windings 36. The rotor 34 is attached to the shaft 18. When the rotor 34 is rotated by turbine power generated by the rotating turbine 14, an alternating current is induced in the stator windings 36. Speed of the turbine 14, can be varied in accordance with external energy demands placed on the system 10. Variations in the turbine speed will produce a variation in the frequency of the alternating current generated by the electrical generator 16. Regardless of the frequency of the ac power generated by the electrical generator 16, the ac power can be rectified to dc power by a rectifier 38, and then chopped by a solid-state electronic inverter 40 to produce ac power having a fixed frequency. Accordingly, when less power is required, the turbine speed can be reduced without affecting the frequency of the ac output.

Moreover, reducing the turbine speed reduces the airflow because the compressor runs slower. Consequently, the turbine inlet temperature remains essentially constant, thus maintaining a high efficiency at part load.

Use of the rectifier 38 and the inverter 40 allows for wide flexibility in determining the electric utility service to be provided by the power generating system of the present invention. Because any inverter 40 can be selected, frequency of the ac power can be selected by the consumer. If there is a direct use for ac power at wild frequencies, the rectifier 38 and inverter 40 can be eliminated.

During operation of the power generating system 10, heat is generated in the electrical generator 16 due to inefficiencies in generator design. In order to extend the life of the electrical generator 16, as well as to capture useful heat, compressor inlet air flows over the generator 16 and absorbs excess heat from the generator 16. The rectifier 38 and the inverter 40 can also be placed in the air stream. After the inlet air has absorbed heat from the aforementioned sources, it is compressed in the compressor 12 and further pre-heated in the recuperator 22.

A controller 42 controls the turbine speed by controlling the amount of fuel flowing to the combustor 24. The controller 42 uses sensor signals generated by a sensor group 44 to determine the external demands upon the power generating system 10 and then controls the fuel valve 26 accordingly. The sensor group 44 could include sensors such as position sensors, turbine speed sensors and various temperature and pressure sensors for measuring operating temperatures and pressures in the system 10. Using the aforementioned sensors, the controller 42 can control both startup and optimal performance during steady state operation.

The power generating system 10 can also include a battery 46 for providing additional storage and backup power. By controlling a switch 47, the controller 42 can have the battery 46 provide power out of the system 10 in the event a generator failure occurs. Thus, the battery 46 can provide uninterruptible power for hours after generator failure. Additionally, the controller 42 can have the battery 46 supply a load when a load increase is demanded. The battery 46 can be sized to handle peak load demand on the system 10. Using signals from the sensor group 44, the controller 42 can also determine the state of direct current storage in the battery 46, and adjust operations to maintain conditions of net charge, net drain, and constant charge of the battery.

A switch/starter control 48 can be provided off-skid to start the power generating system 10. The generator 16 is operated as a starter motor, with startup power being supplied by the battery 46. The switch/starter control 48 supplies an excitation current to the stator windings 36 of the electrical generator 16, which motors the compressor 12. As an alternative to using the electrical generator 16 as a starter motor, a compressed air device could be used to motor the compressor 12.

Referring to FIG. 2, the "engine core" 50 of the power generating system 10 is shown. The compressor 12 includes an impeller 52 having a bore, a compressor scroll 54 and a diffuser channel 56. Air entering an air inlet 58 is filtered by an air filter 59 and directed to the compressor scroll 54. Air flowing out of the compressor scroll 54 is directed to the recuperator 22.

The turbine 14 includes a turbine scroll 60, a plurality of fixed nozzle vanes 62, and a boreless turbine wheel 64. Hot expanding gases leaving the combustor 24 are directed into the turbine scroll 60 and through the nozzle vanes 62, which redirect the hot expanding gas onto the turbine wheel 64. Turbine exhaust gas leaves the turbine 14 through an exhaust diffuser 66, which reduces the temperature and noise of the turbine exhaust gas.

The rotor 34 of the electrical generator 16 includes magnets 68 made of a rare earth material such as samarium cobalt. The magnets 68 are surrounded by a containment sleeve 70 made of a non-magnetic material such as Inconel 718. End caps 71 are secured to the containment sleeve 70 and supported by the foil bearings 76, 78 and 80. Power conductors 72 extend from the stator windings 36 and terminate in a power connector stud 74, which is secured to a housing 73.

The housing 73 provides support for a fuel inlet, the air inlet 58, the compressor 12, the turbine 14, the generator 16, the recuperator 22, the combustor 24, the rectifier 38, and the inverter 40, to enable the system 10 to exist as a packaged unit. The housing is supported at its base 79.

The impeller wheel 52, turbine wheel 64 and rotor 34 are clamped together by a thin, elongated bi-metallic tie-bolt 75 having a diameter of approximately 0.25 inches to 0.5 inches. The tie-bolt 75 includes a short rod 75a made of titanium and an elongated rod 75b made of a typical tie-bolt material such as Inconel 718. The tie-bolt material is typically stronger under high temperatures and more ductile than the titanium. The length of the titanium rod 75a is up to about ten percent of the overall length of the tie-bolt 75. The titanium rod 75*a* and the elongated rod 75*b* are inertia-welded together.

The elongated rod 75*b* extends through bores in the rotor 34 and the compressor impeller 52. The bores have clearances that allow the tie-bolt 75 to extend through the rotor 34 and the impeller 52.

The tie-bolt 75 does not extend through the turbine wheel 64. Instead, the titanium rod 75*a* is inertia-welded to the back of the turbine wheel 64. Thus, the turbine wheel 64 is boreless in that it does not have a bore through which the tie-bolt 75 extends. Eliminating the bore reduces stresses in the turbine wheel 64.

During assembly, the tie-bolt 75 is preloaded in tension, the impeller 52 and the rotor 34 are slid over the elongated rod 75*b*, and a nut 77 is secured to a threaded end 75*c* of the elongated rod 75*b*. Preloading the tie-bolt 75 keeps the impeller 52, turbine wheel 64 and rotor in compression at high rotational speeds (80,000 rpm and above) and high operating temperatures. For example, the tie-bolt 75 can be preloaded in tension to about 90% of yield strength. The tension in the tie-bolt 75 is maintained as the nut 77 is turned.

When clamped together by the tie-bolt 75, the compressor impeller 52, the turbine wheel 64 and the rotor 34 are rotated as a single unit. Under high operating temperatures and rotational speeds, the preloading prevents the tie-bolt 75 from flexing. Flexing of the tie-bolt 75 would tend to separate the faces of the impeller 52, the turbine wheel 64 and the rotor 34. Less thermally conductive than the elongated rod 75*b*, the titanium rod 75*a* serves as a thermal barrier, which mitigates thermal relaxation of the tie-bolt 75 during influx of heat flow from turbine 14. Without the titanium rod 75*a*, the pre-loading would be much greater to prevent tie-bolt flexing.

The titanium rod 75*a* also enhances tie-bolt integrity by eliminating the temperature gradient over the length of the elongated rod 75*b*. Instead, a temperature discontinuity is formed at the interface at the interface of the titanium rod 75*a* and the elongated rod 75*b*. Thus the titanium rod 75*a* reduces thermal cycles over the great majority of the tie-bolt 75, thereby reducing the chance of fatigue failure.

The rotating unit 52, 64 and 34 is supported in a radial direction by inboard and outboard foil journal bearings 76 and 78. The rotating unit 52, 64 and 34 is supported in an axial direction by a foil thrust bearing 80.

Various coolant ports are provided for the engine core 50. Provided are ports 82 and 84 for circulating a coolant over the stator windings 36. Also provided are ports 86 and 88 for circulating a coolant over the foil bearings 76, 78 and 80.

The power generating system 10 can be built in several major modules such as a rotating module, a heat exchanger module, a combustor module, and an electronics module. Each of these modules is relatively lightweight and compact. The modules can be replaced without breaking liquid lines. The use of foil bearings 76, 78 and 80 eliminates the need for an oil-based lubrication system and, therefore, results in low maintenance of the power generating system 10. Scheduled maintenance would consist primarily of replacing the igniter 27, the filter 59 and catalyst elements in the combustor 24.

The power generating system 10 operates on a conventional recuperated Brayton cycle. The Brayton cycle can be operated on a relatively low pressure ratio (e.g., 3.8) to maximize overall efficiency; since, in recuperated cycles, the lower the pressure ratio, the closer the turbine exhaust temperature is to the inlet temperature. This allows heat addition to the cycle at high temperature and, in accordance with the law of Carnot, reduces the entropic losses associated with supplying heat to the cycle. This high temperature heat addition results in an increased overall cycle efficiency.

The values that follow are provided as an example. Air is compressed in a single stage radial compressor to 3.8 bars. The compressed air can be directed to the recuperator 22 where the temperature of the compressed air is increased using the waste heat from the turbine exhaust gas. The temperature of the exhaust gas from the turbine is limited to about 1,300° F. in order to help extend the life of the recuperator 22. For exhaust gas temperatures above 1,300° F., the recuperator 22 can be made of super alloys instead of stainless steel. The recuperator 22 can be designed for either 85% or 90% effectiveness depending on the economic needs of the customer. In the most efficient configuration, and using the 90% recuperation, the overall net cycle efficiency is 30%, yielding a high heating value heat rate of approximately 11,900 BTU/kWh on diesel.

After being heated in the recuperator 22, the compressed air is directed to the combustor 24, where additional heat is added to raise the temperature of the compressed air to 1,650° F. A combustor 24 designed according to a conventional design can yield a Nox level of less than 25 ppm, and a combustor 24 using a catalyst can yield a Nox rate that is virtually undetectable (commercial Nox sensors are limited to a 2 to 3 ppm detection range). The high enthalpic gas is then expanded through the turbine 14. The impeller 52, the turbine wheel 64, the rotor 34, and the tie-bolt 75—the only moving parts in the engine core 50—spin as a single unit at high speeds of approximately 80,000 rpm or more. The resulting generator output frequency of around 1,200 hertz is then reduced by the rectifier 38 and the inverter 40 to a grid-compatible 50 or 60 cycles. Resulting is a high power density typified by low weight (about a third of the size of a comparable diesel generator) and a small footprint (for example, approximately 3 feet by 5 feet by 6 feet high).

The high power density and low weight of the microturbine power generating system 10 is made possible through the high speed components which permit large amounts of power using a minimum amount of material. The microturbine power generating system 10 can be completely self-contained in a weather proof enclosure. The power generating system 10 is "plug and play", requiring little more than a supply of clean fuel, liquid or gas.

Thus disclosed is a power generating system 10 that can use multiple fuels including natural gas, diesel and JP-8. The power generating system 10 has a low thermal signature and minimal noise generation. The use of air bearings eliminates the need for an oil-based lubrication system. The electrical generation system 10 has high reliability and minimal service requirements due to single moving part design. The use of a solid-state electronic inverter allows the system 10 to provide a variable AC output. Installation is easy due to a modular and self-contained design, and servicing is easy because the system 10 has one moving part and major parts that are easily accessible. The width, length and height of the engine core 50 can be adjusted to fit a wide variety of dimensional requirements.

The microturbine power generating system 10 is smaller, lighter, more fuel-efficient and has lower thermal signature, noise, maintenance and cost penalties than comparable internal combustion engines. Therefore, due to its low installation costs, high efficiency, high reliability and simple, low cost maintenance, the power generating system 10 provides lower operating and fixed costs than power generators of comparable size.

Figure 3:
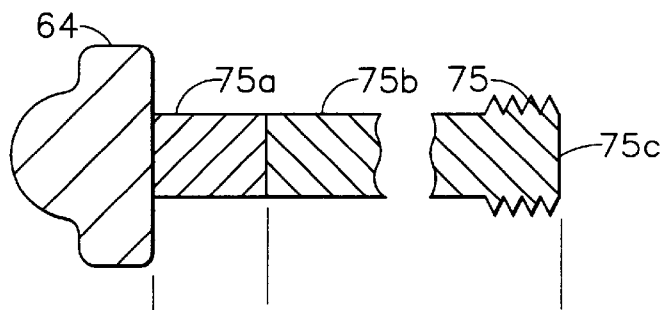
FIG. 3 is an illustration of the bi-metallic tie-bolt secured to a turbine wheel.
Figure 3A:
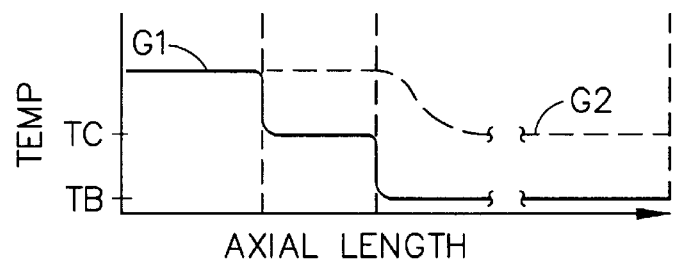
FIG. 3a is an illustration of a thermal gradient in the tie-bolt.

The bi-metallic tie-bolt 75 has a reduced thermal gradient and lower operating temperature than a tie-bolt made entirely of a conventional tie-bolt material. FIG. 3*a* shows the gradient G1 (in solid) and temperature TB of the bi-metallic tie-bolt 75 and a corresponding gradient G2 (in dashed) and temperature Tc of a conventional tie-bolt. During operation, the conventional tie-bolt will expand more than the bi-metallic tie-bolt 75 and, consequently, will unload more of the preload. Thus, the bi-metallic tie-bolt 75 can use a lower preload to maintain the impeller 52, turbine wheel 64 and rotor 34 in compression. The lower preload, in turn, makes for easier assembly of the rotating group 52, 64 and 34. The lower preload also increases the structural integrity and life of the tie-bolt.

Figure 4:
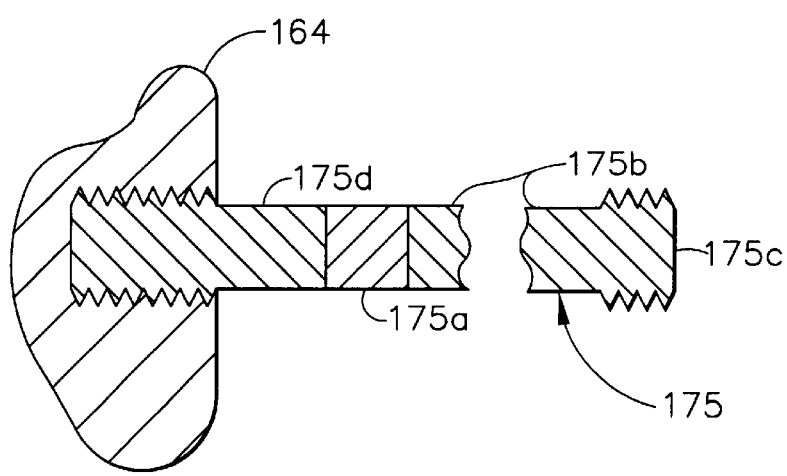
FIG. 4 is an illustration of an alternative embodiment of a bi-metallic tie-bolt secured to a turbine wheel.

The invention is not limited to the specific embodiments disclosed above. The length of the tie-bolt 75 depends upon the axial length of the rotating components. The titanium rod 75*a* does not have to be located at an end of the tie-bolt. For example, FIG. 4 shows a tie-bolt 175 including a titanium rod 175*a* that is inertia-welded between first and second rods 175*d*, 175*b* made of conventional tie-bolt material. The second rod 175*b* made of conventional tie-bolt material is elongated and has a free end 175*c* that is threaded. The first rod 175*d* made of conventional tie-bolt material is secured between the titanium rod 175*a* and a turbine wheel 164. During operation of the microturbine power generating system 10 a temperature gradient would develop in the first rod 175*d* made of conventional tie-bolt material, a thermal discontinuity would develop at the interface of the first rod 175*d* and the titanium rod 175*a*, and a negligible temperature gradient would develop along the second rod 175*b* of the tie-bolt 175.

The tie-bolt 175 shown in FIG. 4 can be attached to the turbine wheel by means other than an inertia weld. For example, an end of the first rod 175*d* made of conventional tie-bolt material can be threaded to engage internal threads in the turbine wheel 164.

Thus, the present invention is not limited to the specific embodiments disclosed above. Instead, the present invention is construed according to the claims that follow.

What is claimed is:

1. A microturbine power generating system for producing power comprising:
    a turbine for converting gaseous heat energy into mechanical energy, the turbine including a turbine wheel;
    a power converter for converting the mechanical energy produced by the turbine into electrical energy, the power converter including a rotor; and
    a tie-bolt connecting the turbine wheel and the rotor in prestressed relation to allow the rotor to rotate in unison with the turbine wheel and to thereby use the mechanical energy extracted by the turbine to produce power;
    the tie-bolt including an elongated first portion made of conventional tie-bolt material selected from the group that includes Inconel metals and stainless steels and a short second portion made of a material that is less thermally conductive than the conventional tie-bolt material.

2. The microturbine power generating system of claim 1, further comprising a compressor including a compressor wheel, the elongated portion of the tie-bolt extending through the compressor and the rotor, the compressor wheel being coupled in prestressed relation with the turbine and the rotor.

3. The microturbine power generating system of claim 1, wherein the turbine wheel is boreless, and wherein a first end of the short portion of the tie-bolt is inertia-welded to the turbine wheel.

4. The microturbine power generating system of claim 3, wherein a second end of the short portion is inertia-welded to an end of the elongated portion.

5. The microturbine power generating system of claim 1, wherein the short portion of the tie-bolt is made of titanium.

6. The microturbine power generating system of claim 1, wherein the length of the second portion is less than about ten percent of the overall length of the tie-bolt.

7. The microturbine power generating system of claim 1, wherein the tie-bolt further includes a third portion made of conventional tie-bolt material selected from the group that includes Inconel metals and stainless steels, the second portion being secured between the first and third portions.

8. A rotating module of a microturbine power generating system, comprising:
    an impeller wheel;
    a generator rotor;
    a turbine wheel; and
    a prestressed tie-bolt, the tie-bolt including a first portion made of titanium and a second portion made of conventional tie-bolt material selected from the group that includes Inconel metals and stainless steels, the first portion of the tie-bolt being secured to the turbine wheel, the second portion of the tie-bolt extending through bores in the rotor and the impeller.

9. The rotating module of claim 8, wherein the turbine wheel is boreless, and wherein a first end of the short portion of the tie-bolt is inertia-welded to the turbine wheel.

10. The rotating module of claim 8, wherein the short and elongated portions of the tie-bolt are inertia-welded together.

11. The microturbine power generating system of claim 8, wherein the length of the first portion is less than about ten percent of the overall length of the tie-bolt.

12. Apparatus for a microturbine power generating system, the combination comprising:
    a turbine wheel; and
    a tie bolt having a short first portion made of titanium; and an elongated second portion made of conventional tie-bolt material selected from the group that includes Inconel metals and stainless steels, the first and second portions being secured together, one end of the tie-bolt being secured to the turbine wheel, a free end of the tie-bolt being threaded.

13. The apparatus of claim 12, wherein the turbine wheel is boreless, and wherein the short first portion of the tie-bolt is inertia-welded to the turbine wheel.

14. The apparatus of claim 12, wherein the first and second portions of the tie-bolt are inertia-welded together.

15. The apparatus of claim 12, wherein the elongated second portion of the tie-bolt is made of Inconel.

16. The apparatus of claim 12, wherein the length of the short first portion is less than about ten percent of the overall length of the tie-bolt.

17. The apparatus of claim 12, further having a third portion made of conventional tie-bolt material selected from the group that includes Inconel metals and stainless steels, wherein the short portion is secured between the second and third portions.

18. The apparatus of claim 17, wherein the third portion is threadedly secured to the turbine wheel.

* * * * *